United States Patent [19]

Archibald et al.

[11] Patent Number: 4,854,034
[45] Date of Patent: Aug. 8, 1989

[54] METHOD FOR PRODUCING A STACK OF LAMINATIONS WITH SKEWED CONDUCTOR SLOTS

[75] Inventors: James B. Archibald, Schenectady; Steven L. Adams, Clifton Park, both of N.Y.

[73] Assignee: General Electric Company, Schenectady, N.Y.

[21] Appl. No.: 199,645

[22] Filed: May 27, 1988

[51] Int. Cl.$^4$ ............................................. H02K 15/02
[52] U.S. Cl. ........................................ 29/596; 29/598; 29/738; 156/153
[58] Field of Search .................. 29/598, 738, 732, 596, 29/DIG. 19, DIG. 26; 156/153, 154; 310/211

[56] References Cited

U.S. PATENT DOCUMENTS 2,424,443  7/1947  Evans ...................................... 29/596

Primary Examiner—Robert A. Dawson
Assistant Examiner—Jeff H. Aftergut
Attorney, Agent, or Firm—Jerome C. Squillaro

[57] ABSTRACT

A stator of a dynamoelectric machine is preassembled using guidance members which are disposed at a skew angle with respect to a central axis of the stator. The outer perimeter of the preassembled elements is then machined to form guidance elements disposed parallel to a central axis of the stator. Then, the preassembled elements are mounted in a frame on further guidance elements disposed parallel to the central axis of the stator. During final assembly, axial compression forces act parallel to guidance forces, whereby hanging up is avoided.

7 Claims, 5 Drawing Sheets

METHOD FOR PRODUCING A STACK OF LAMINATIONS WITH SKEWED CONDUCTOR SLOTS

BACKGROUND OF THE INVENTION

The present invention relates to dynamoelectric machines and, more particularly, to dynamoelectric machines wherein one of the elements is formed by stacking a plurality of lamellae of a magnetic metal.

Although the present invention may be employed to form a stationary or rotating member of a dynamoelectric machine, for concreteness of description, the following description is directed toward the assembly of an annular stator of a large generator. The problems associated with the assembly of corresponding elements of a motor are so similar that one skilled in the art with the present disclosure for reference would be fully enabled to apply the present invention to such apparatus.

Large generators commonly employ a solid forged rotor excited by a source of direct current to produce a magnetic field. The rotor is rotated by torque applied thereto, whereby the magnetic field is also rotated. The rotor rotates within an annulus of magnetic metal containing a plurality of conductor bars set into slots. The conductor bars are interconnected by end turns to form coils. As the magnetic field of the rotor sweeps past the stationary conductor bars, an alternating current is induced in the conductor bars.

If measures were not taken to prevent it, the resulting rapid reversals of magnetic flux in the magnetic metal forming the stator would induce large eddy currents therein, leading to substantial resistive losses. In order to reduce such eddy-current losses to a minimum, a stator is conventionally built up by stacking a plurality of thin (0.014 inch) lamellae of a high-resistance magnetic material such as, for example, silica steel.

Such stacking is conventionally aided by one or more dovetail-shaped key bars affixed inside a stator frame for engaging dovetail-shaped slots in the individual lamellae. During stacking of the stator, the dovetail slots of the lamellae are fitted onto the dovetail-shaped key bars. As the stator is being built up, an axial compressive force is applied to the ends of the stack and maintained for a substantial time to compress the lamellae into a rigid assembly.

Instead of dovetail-shaped engaging elements, it is within contemplation to employ one or more tabs extending radially outward from the outer perimeter thereof. One or more bars affixed to the stator frame each includes a slot therein for engagement with the tabs extending from the lamellae. For present purposes, both of these techniques for aligning the lamellae in a stack for assembly of a stator correspond to each other and suffer the same drawbacks which the present invention seeks to overcome.

It is well known that conductor bars that are disposed parallel to the axis of a stator of a generator give rise to harmonic waveform degradation. One solution to this problem is to skew the slots in the interior of the stator annulus. This has been performed by skewing the dovetail-shaped key bars or slotted bars so that, when the lamellae are stacked thereon, the slots for the conductor bars are similarly skewed. A problem produced by such skewed guidance limits the amount of skew which can be tolerated.

The problem arises because the compression forces applied to the ends of the in-process stator are exerted parallel to the axis of the annulus. The guiding members (key bars or slotted bars) are skewed with respect to the axis of the stator. Up to about four degrees of skew, the differences between compression and guidance angles can be accommodated by manufacturing tolerances and deformation of material to attain satisfactory assembly. At skew angles exceeding about four degrees, the difference between the angle of applied compression force (axial) and the angle of lamellae guidance (skewed) results in the lamellae hanging up on the key bars or slotted bars. As a result of such hanging up, it is not possible to attain sufficient compression on the lamellae to produce a substantially rigid stator stack.

OBJECTS AND SUMMARY OF THE INVENTION

Accordingly, it is an object of the invention to provide a method for assembling a laminated assembly which overcomes the drawbacks of the prior art.

It is a further object of the invention to provide a laminated assembly formed by the foregoing method.

It is a further object of the invention to provide a method for assembling a laminated assembly of a type including slots for conductor bars, wherein a skew of the slots with respect to an axis of the laminated assembly is greater than permitted by methods of the prior art.

It is a still further object of the invention to provide a laminated assembly of a type including slots for conductor bars wherein the slots are skewed at an angle with respect to an axis thereof greater than permitted by the prior art.

It is a still further object of the invention to provide a method for assembling lamellae to form a laminated magnetic assembly of a type having a plurality of slots for conductor bars therein including aligning said lamellae to produce a skew of said slots, then forming guiding elements in a peripheral surface of the lamellae, wherein the guiding elements are parallel to an axis of the magnetic assembly.

It is a still further object of the invention to provide a magnetic assembly of a type having a plurality of skewed slots for conductor bars therein and guiding elements in an exterior peripheral surface of the magnetic assembly which are parallel to an axis of the magnetic assembly.

Briefly stated, the present invention provides a stator of a dynamoelectric machine which is preassembled using guidance members. The guidance members are disposed at a skew angle with respect to a central axis of the stator. The outer perimeter of the preassembled stator is then machined to form guidance elements disposed parallel to a central axis of the stator. Then, the preassembled elements are mounted in a frame on further guidance elements disposed parallel to the central axis of the stator. During final assembly, axial compression forces act parallel to guidance forces, whereby hanging up is avoided.

According to an embodiment of the invention, there is provided a method for forming a stator of a dynamoelectric machine comprising: providing a stacking guide having a skew angle, stacking lamellae of a magnetic metal on the stacking guide to form a stack, whereby the lamellae are given a skew equal to the skew angle, securing the stack against movement, machining guide elements in an exterior surface of the stack, and installing the stack in a stator frame upon guide members mating with the guide elements.

According to a feature of the invention the present invention provides a stator formed by the method set forth in the preceding paragraph.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
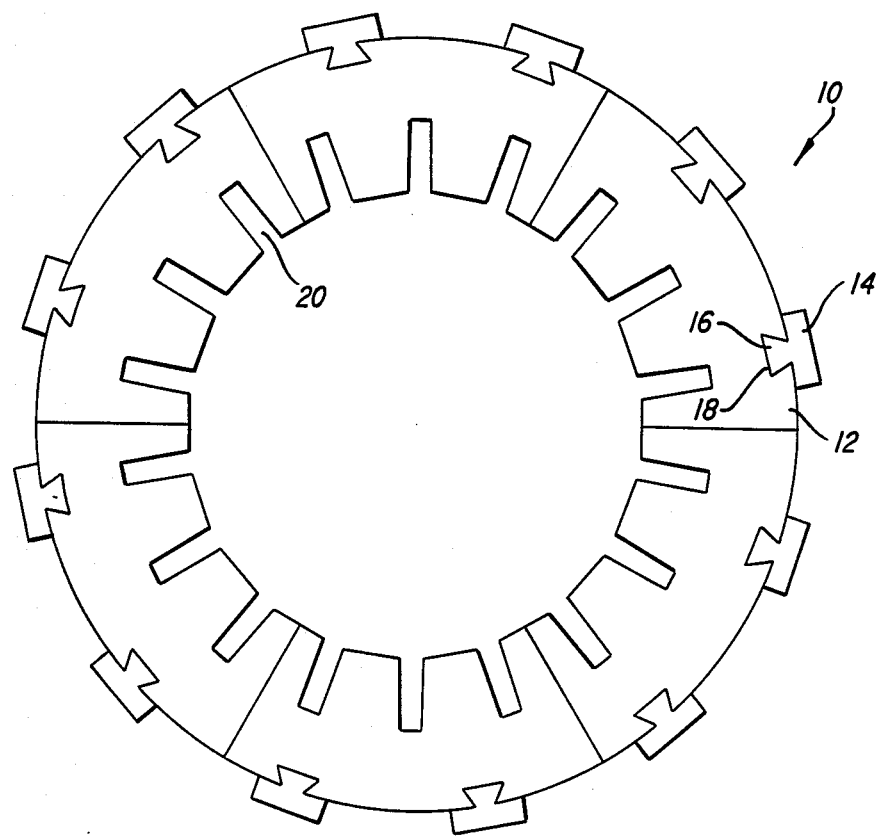
FIG. 1 is an end view of a stator of a dynamoelectric machine from which all elements not necessary to the description thereof are omitted.

Referring first to FIG. 1, a stator 10 is built up as an annular stack of lamination segments 12. Each lamination segment 12 is a thin (for example, about 0.014 inch) lamella of a high- resistivity magnetic metal, conventionally silica steel. Each lamella is electrically insulated from its upper and lower neighbors, in order to force any eddy currents induced therein to flow in a relatively long path within lamination segment 12.

A plurality of key bars 14 are disposed within a stator frame (not otherwise shown). Each key bar 14 includes a dovetail portion 16 upon which a dovetail slot 18 in the outer perimeter of lamination segment 12 is fitted. Each lamination segment 12 includes a plurality of conductor slots 20 in its inner edge.

The number of lamination segments 12 making up a layer may vary from machine to machine. Common numbers include six and twelve. Similarly, the number of key bars 14 and conductor slots 20 may also vary. Such variations are not of concern to the present invention. The embodiment used in the present disclosure is illustrative only, and should not be seen as limiting the invention.

Figure 2:
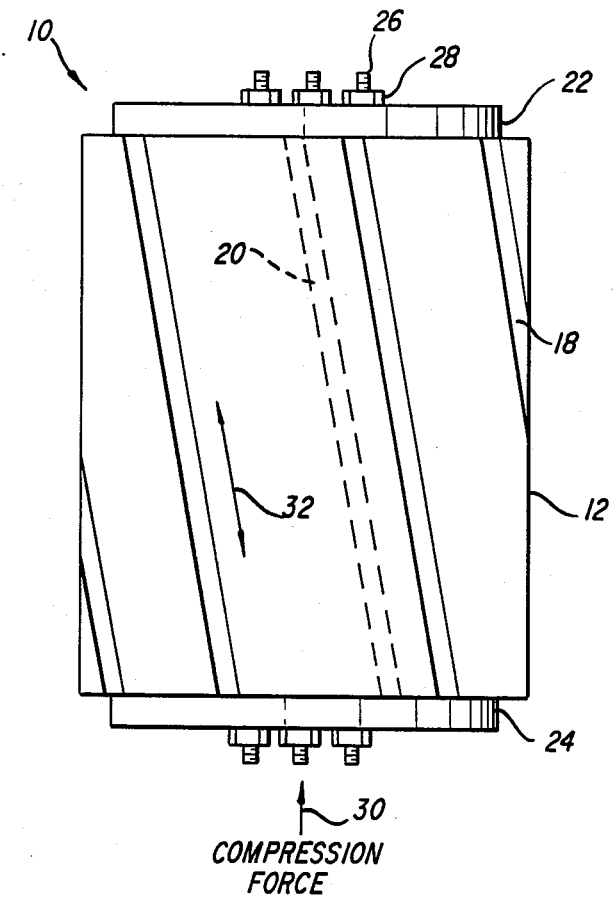
FIG. 2 is a side view of a stator of a dynamoelectric machine to which compression forces are being applied for bonding of lamellae thereof.

Referring now to FIG. 2, lamination segment 12 is shown with key bars 14 (FIG. 1) omitted to reveal elements necessary to the description. As noted in the description of the background of the invention, it is desirable to skew the conductors (not shown) laid in conductor slots 20 with respect to a central axis of stator 10. This is conventionally done by skewing key bars 14 with respect to the axis. Then, as the stack is formed using key bars 14 for guidance, conductor slots 20 are given a corresponding skew. In the conventional assembly process, layers of lamination segments 12 are placed in the growing stack forming stator 10 until several inches of depth is attained. Then, a bonding material such as, for example, an epoxy, is applied and a compression force is applied to the portion of the stack then existing. The compression force is maintained for a substantial time until the bonding material is set or cured. Then, stacking is resumed. Compression forces may be applied, for example, using first and second end plates 22 and 24 with a plurality of rods 26 passing therebetween. Each rod 26 engages a nut 28 which tends to apply a compression force in an axial direction as indicated by a force arrow 30. Due to the skewing of the key bars 14, guidance forces are also skewed as indicated by a skewed guidance arrow 32. The angle between force arrow 30 and skewed guidance arrow 32 is the skew angle of dovetail slots 18 and conductor slots 20.

From a practical standpoint, it has been found that a skew angle exceeding about four degrees prevents sufficient compression and bonding to produce a stator 10 that acts as though it were a single, solid piece of metal. The reason often given for such failure to attain a solid stack is hanging up of dovetail slots 18 on dovetail portions 16 due to the differences between the directions of force arrow 30 and skewed guidance arrow 32.

Figure 3:
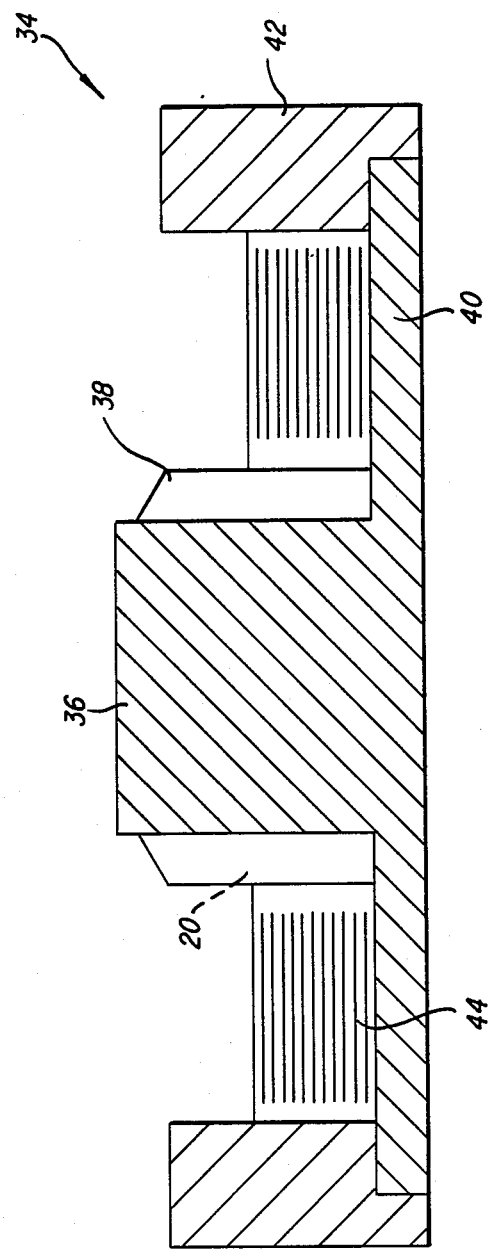
FIG. 3 is a cross section of a stacking fixture upon which a partial packet of lamellae has been formed.

Referring now to FIG. 3, a stacking fixture 34 is shown which permits assembly of a stator 10 having a skew angle as great as desired without being limited by hanging up of dovetail slots 18 on dovetail portions 16. A central mandrel 36 includes a plurality of skewed protuberances 38 having a skew angle with respect to a central axis of mandrel 36 equal to the desired skew angle of conductor slots 20. A bottom plate 40 supports lamination segments 12 as they are laid in place in stacking fixture 34. An outer guide circle 42 defines an outer diameter of a donut or packet 44. Guided by skewed protuberances 38, packet 44 is built up with conductor slots 20 following the skew angle of skewed protuberance 38. When a complete packet 44 has been formed in stacking fixture 34, it is removed from stacking fixture 34 and, while being held in the relationship formed by assembly in stacking fixture 34, a plurality of dovetail slots 18, parallel to the axis thereof, are machined therein.

Figure 4:
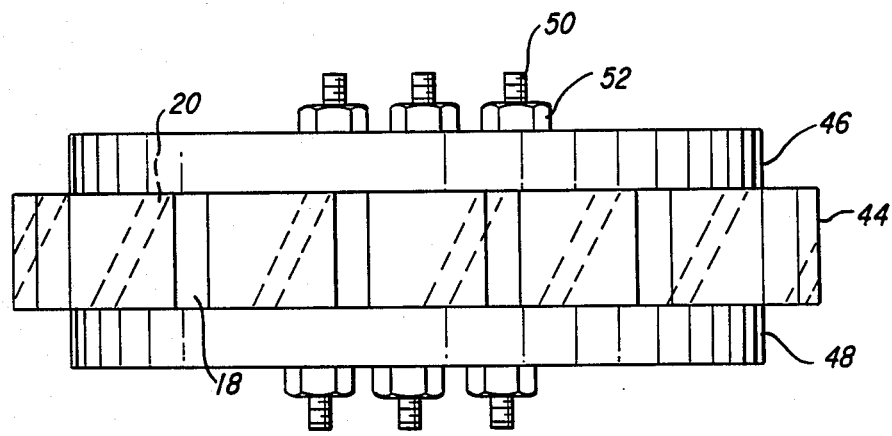
FIG. 4 is a side view of a completed packet of lamellae in which a plurality of dovetail slots have been machined.

Referring now to FIG. 4, a packet 44 is shown compressed between first and second pressure plates 48 and 50 by a plurality of bolts 50 onto which corresponding nuts 52 are tightened. Held in the condition shown, with conductor slots 20 in the skewed condition indicated in dashed line, dovetail slots 18 are machined in the perimeter of packet 44. Then, packet 44 is released from pressure plates 46 and 48 and packet 44 is assembled onto key bars 14 (FIG. 1) which are disposed parallel to the central axis of stator 10. It will be evident that, when an axial compression force is applied to a stator 10 formed of a plurality of packets 44, the compression force and guidance forces are parallel to each other. As a consequence, the problems arising from dovetail slots 18 hanging up on dovetail portions 16 are eliminated.

Still referring to FIG. 4, in one embodiment of the invention, packet 44 is bonded during compression to form a unitary assembly. Then, during assembly of stator 10, a plurality of packets 44 are stacked end to end. In one embodiment of the invention, each packet 44 has an axial length of about two inches. Thus, each packet 44 contains about 70 layers of lamination segments 12. To build a stator 10 of, for example, 28 inches, requires installation of 14 packets 44. This leaves only 13 interpacket interfaces to be bonded during final compression and bonding in stator 10. Since the compression and guidance forces are parallel to each other, no problem with hanging up is expected.

Figure 5:
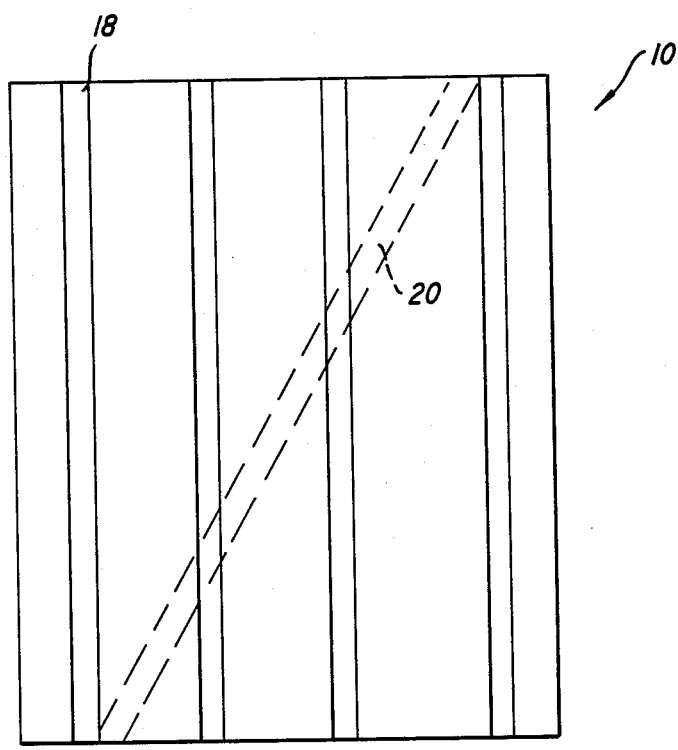
FIG. 5 is a side view of a stator manufactured according to the method of the present invention, with the location of one of the slots for conductor bars in the interior of the stator indicated in dashed line.

The resulting stator 10 is shown in FIG. 5, wherein dovetail portion 18 are parallel to the central axis of stator 10, while conductor slots 20 (only one of which is shown) are skewed at whatever skew angle is desired.

In the alternative, instead of bonding a packet 44 after stacking in stacking fixture 34, packet 44 may remain unbonded at that time. While being held together by pressure plates 46 and 48 (or any corresponding means), dovetail slots 18 are machined therein. Then, the unbonded stack may be installed on key bars 14 for final compression and bonding during stacking of stator 10. In this technique, hanging up is also not a problem. Accordingly, a tight, unitary stator 10 can be formed.

A technique for aligning dovetail slots 18 and conductor slots 20 in succeeding packets 44 would occur to one skilled in the art. As one technique, a dummy bar, skewed at the desired skew angle is engaged in a conductor slot 20 of a completed packet 44 and in a conductor slot 20 of a packet 44 in which it is desired to machine dovetail slots 18. With such alignment, dovetail slots 18 are machined in the new packet 44 as continuations of the dovetail slots 18 in the completed packet 44. Other techniques would occur to one skilled in the art.

Other techniques for stacking packets 44 are possible. For example, instead of using conductor slots 20 in the inner diameter of stator 10, each lamination segment 12 may include an outward-directed tab (not shown) for engagement with a skewed slot (not shown) in outer guide circle 42. Once the desired skewed alignment is attained, and packet 44 is clamped together, the tabs may be machined off, either before or after dovetail slots 18 are machined in the outer perimeter of stator 10. As a further alternative, a single slot (not shown) may be formed in each lamination segment 12 prior to initial assembly of packet 44. A plurality of skewed bars (not shown) affixed to outer guide circle 42 may be substituted for skewed protuberances 38 shown affixed to mandrel 36 in FIG. 3. In such an embodiment, slots used for assembly remain in the outer perimeter of packet 44, and thus this embodiment may not be preferred.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What we claim is:

1. A method for forming a stator of a dynamoelectric machine comprising:

providing a stacking guide having a skew angle;
    stacking lamellae of a magnetic metal on said stacking guide to form a stack, whereby said lamellae are given askew equal to said skew angle;
    securing said stack against movement;
    machining guide elements in an exterior surface of said stack; and
    installing said stack in a stator frame upon guide members mating with said guide elements.

2. A method according to claim 1 wherein the step of machining includes machining said guide elements substantially parallel to a central axis of said stator.

3. A method according to claim 1 wherein:

the step of stacking includes stacking less than all of said lamellae to form a first donut;
    machining said guide elements in said first donut;
    stacking an additional number of said lamellae to form at least a second donut;
    machining said guide elements in said second donut;
    installing said first donut in said stator frame;
    installing said at least a second donut in said stator frame; and
    compressing and bonding said first and said at least a second donut in said stator frame to form said stator.

4. A method according to claim 3 wherein the steps of stacking includes bonding said first donut and bonding said at least a second donut before performing the step of installing.

5. A method according to claim 1 wherein, further comprising:

forming at least one slot in an inner edge of each of said lamellae;
    the step of providing a stacking guide including providing a stacking guide having at least one skewed protuberance upon which said at least one slot may be fitted; and
    the step of stacking including stacking said lamellae with said at least one slot engaging said at least one protuberance, whereby said stack is given said skew.

6. A method according to claim 1 wherein the step of stacking includes stacking lamellae to form an entire stator.

7. A method according to claim 1 wherein:

said guide elements include dovetail slots in an external edge of each of said lamellae; and
    said guide members include key bars having dovetail portions mateable with said dovetail slots.

* * * * *